though the latter may be heated somewhat to reduce viscosity for example, and mixed as by stirring. The rate at which pigment is added to the monomer is such as to permit adequate wetting out of the pigment by the monomer. This rate will of course vary depending on such factors as particular pigment and monomer selected, the temperature and viscosity of the monomer, etc. Wetting is considered to be adequate when substantially all the pigment added becomes incorporated into a pigment-monomer mass. The addition of pigment is continued until a high shear mass is obtained. By "high shear mass" is meant a pigment-monomer mass so viscous or of such a consistency that it is no longer a liquid. Various physical appearances of high shear mass may be encountered, varying from a material approximating the consistency of moist sand to a clay-like or dough-like mass. In general, high shear mass is a material which, though comprising a large amount of liquid, exhibits substantially no flow of its own accord. The point at which high shear mass is reached for a given pigment-monomer system is readily determined by simple observation, and in most instances is quite evident.

After a high shear mass is obtained, the mass is subjected to continued agitation, as by stirring, for a period of time sufficient to permit the essentially complete breaking down of pigment agglomerates and formation of a uniform dispersion of pigment in monomer. The length of time required to produce the uniform dispersion depends on the particular pigment and monomer chosen, the size of the batch, and similar factors, but in the usual case is readily determinable by observation. In general, batches of from about 1 to 5 gallons require from about 10 to about 30 minutes. Also, in most instances a uniform dispersion is considered to have been obtained when at least 95% of the pigment is broken down to its ultimate particle size.

The high shear mass is then let down or cut back with additional monomer to the desired pigment concentration. In most instances pigment loadings of from about 0.001 to about 5 weight percent, based on the total weight of the casting to be made, are employed, and more usually the pigment loading is within the range of from about 0.05 to about 3 weight percent on the same basis.

The pigment-monomer dispersion, together with added pigment-monomer dispersion of the same or different color if desired, other conventional additives such as polymerization catalyst, fillers, and the like, is placed in a suitable container such as a mold and subjected to polymerization conditions. The resulting resin castings exhibit the characteristics of high gloss, absence of internal flaws, and retention of physical properties, as noted above.

Any normally liquid olefinically unsaturated monomer which undergoes free radical initiated polymerization and which is suitable for the production of castings may be employed. The term "normally liquid" is meant to include not only those monomers which themselves are liquid at ordinary room temperatures, but also those monomer systems wherein a solid monomer is dissolved in a liquid monomer to thereby form a liquid monomer system. Normally liquid monomers particularly suitable in the practice of this invention include vinyl esters such as vinyl acetate, vinyl propionate, vinyl butyrate, etc.; alkyl esters of acrylic and methacrylic acids such as methyl acrylate, methyl methacrylate, ethyl acrylate, ethyl methacrylate, and like esters containing up to 18 carbon atoms in the alkyl group; and the unsaturated polyester-monomer resin systems commonly encountered in the casting art. As is known in the resin casting art, unsaturated polyester resins are the reaction products of a polyhydric alcohol and an alpha, beta ethylenically unsaturated polycarboxylic acid, modified if desired by reaction with an aromatic polycarboxylic acid. Suitable polyhydric alcohols, unsaturated polycarboxylic acids and modifying aromatic polycarboxylic acids are disclosed for example in U.S. Pat. No. 2,593,787. Typical olefinically unsaturated monomers employed in conjunction with the polyester resin to form the polyester-monomer resin system include styrene, vinyl toluene, alpha-methyl styrene, divinyl benzene, and the acrylate and methacrylate esters noted above. Such polyester-monomer resin systems are described for example in U.S. Pat. No. 2,593,787 and are commercially available.

Any pigment capable of being dispersed in the selected monomer system may be employed. Suitable pigments include the inorganic pigments such as the chrome yellows and greens, zinc oxide, titanium dioxide, prussian blue, carbon black, cadmium and molybdate oranges and reds, and the organic pigments such as the phthalocyanine blues and greens, toluidine reds, para reds, lithol reds, madder lakes, dianisidine orange, benzidine yellow, and the like. Combinations of pigments of course may be employed if desired.

Additives conventionally employed in the preparation of polymeric resin castings may be used in the practice of this invention. Thus for example catalysts such as benzoyl peroxide, methyl ethyl ketone peroxide, cumene hydroperoxide, t-butyl hydroperoxide, di-t-butyl peroxide, dicumyl peroxide, and the like may be employed in catalytic amounts, with or without the usual polymerization promoters such as cobalt naphthenate, lauryl mercaptan, dimethyl aniline, and the like. Polymerization inhibitors such as hydroquinone, tertiary butyl catechol, and like known inhibitors may be employed to provide the desired shelf life of the pigment-monomer dispersion prior to polymerization thereof. Fillers such as clays, mica, cotton flock, wood flour, silica, and other conventional fillers also may be employed, as may known reinforcing agents such as glass fibers.

The following examples illustrate the invention, it being understood that these examples are presented by way of illustration and not by way of limitation. Unless otherwise specified, all parts and percentages in the examples as well as elsewhere in the specification are by weight.

EXAMPLE I

A portion, 900 g., of an unsaturated polyester resin (a 70/30 weight ratio solution of the reaction product of maleic anhydride, phthalic anhydride and propylene glycol (1/1/2.2 mole ratio) and styrene monomer, having a viscosity of 13 poises at 25°C., an acid number of 28, and containing 100 ppm hydroquinone as polymerization inhibitor) was placed in a 1 gallon container equipped with a Cowles dissolver as an agitating means. The resin was agitated and 600 g. of titanium dioxide pigment (Ti-Pure

PIGMENTED POLYMERIC RESIN CASTINGS

BACKGROUND OF THE INVENTION

Colored polymeric resin cast and molded articles find utility in numerous applications. Such castings and moldings are used, for example, for radio and appliance housings, road markers and signs, decorative items used as trim in motor vehicles, household articles such as kitchen utensil racks and utensil handles, cigarette boxes, and the like. Colored polymeric resins are commonly prepared by incorporating a pigment into the polymeric resin by means of extremely high shear mixers such as roll mills and Banbury mixers. Use of such mixers not only requires the expenditure of large amounts of energy, but the mechanical shear applied to the polymeric resin causes degradation of the polymer with resultant loss of physical properties. Furthermore, gases and moisture sorbed on the pigment become occluded in the viscous polymer. The effects of pigment agglomerates and occluded moisture and gases on cast and molded products made from such mixtures are dull surfaces and possibly minor internal flaws.

SUMMARY OF THE INVENTION

It is therefore an object of this invention to provide an improved process for the preparation of pigmented polymeric resin castings.

It is another object of this invention to provide pigmented polymeric resin castings having superior properties.

Still other objects will be apparent to those skilled in the art from the following description of this invention.

The foregoing objects are achieved in accordance with the practice of this invention. Broadly, this invention consists of a process for preparing pigmented polymeric resin castings comprising:

a. adding pigment to a normally liquid olefinically unsaturated monomer, with mixing, the rate of addition of said pigment being such as to permit wetting out of the pigment in said monomer, said addition being continued until a high shear mass is obtained;

b. agitating said high shear mass for a period of time sufficient to permit the essentially complete breaking down of agglomerates and the forming of an essentially uniform base disperion of the pigment in the monomer;

c. adding to said base pigment dispersion, with mixing, additional normally liquid olefinically unsaturated monomer to reduce the viscosity thereof;

d. placing the dispersion of reduced viscosity in a suitable mold; and e. subjecting said dispersion of reduced viscosity to polymerizing conditions; and pigmented polymeric resin castings made by the foregoing process.

By the practice of this invention it is possible to obtain superior pigmented polymeric resin castings. Pigmented polymeric resin castings obtained by the process of the instant invention are characterized by high gloss, lack of internal flaws, and retention of physical properties.

DESCRIPTION OF THE PREFERRED EMBODIMENT

The pigmented polymeric resin castings of the present invention are not limited to the use of any particular pigmentary material. Any suitable pigment, either of an inorganic or of an organic nature, may be readily employed. As is well known in the art, such pigmentary grade material will ordinarily have a particle size of about 1 micron or less. Illustrative of the variety of inorganic pigments that may be employed in the practice of the present invention are the chrome yellows such as primrose, light, and medium shades; molybdate oranges such as lead chromates modified with molybdenum; chrome oranges such as lead chromates without molybdenum; iron blues such as the Milori blues; titanium dioxide; cadmium red; cadmium yellow; iron oxide pigments such as the red and yellow shades; extender pigments such as clays, calcium carbonates, barium sulfate, and the like; and carbon black.

Illustrative of the various classes or organic pigments that may be employed in the present invention are phthalocyanine pigments, quinacridone pigments, vat pigments, and organic azo pigments. Examples of suitable phthalocyanine pigments are phthalocyanine blue and phthalocyanine green pigments, including partially brominated phthalocyanine green pigments. Examples of suitable quinacridone pigments which may be employed in accordance with the present invention include DuPont Monastral Red Y and Harmon Quindo Magenta. Illustrative vat pigments are Carbazol Violet, Hydron Blue RG and Hydron Pink. Illustrative organic azo pigments include the Lithol Reds, 2 B Reds, and BON Reds.

The base pigment dispersions in normally liquid olefinically unsaturated monomer are prepared by adding the desired pigmentary material, as for example the pigments indicated above, to any suitable normally liquid olefinically unsaturated monomer according to the process of this invention. If desired, a surfactant may be present in the monomer during pigment addition. Since the present invention is concerned with resin castings, it is restricted to resins which are formed by addition polymerization as opposed to condensation polymerization. Condensation polymerizations involve the elimination of a molecule such as water or ammonia for each bond formed to make the polymer. As a result of the elimination reaction, the volume of the resultant condensation polymer is less than that of the reactants. Accordingly, attempts to make satisfactory condensation polymer castings are unsuccessful since the polymer shrinks in the mold. Thus the instant invention is restricted to polymeric resins that are formed by an addition polymerization which does not involve an elimination reaction with resultant shrinkage of the polymer with respect to the volume of the monomer. Therefore, the polymeric resins of this invention are those formed by the addition polymerization of normally liquid olefinically unsaturated monomers. Examples of suitable normally liquid olefinically unsaturated monomers are acrylic monomers such as acrylonitrile, acrylate esters, acrylic acid, methacrylate esters, and methacrylic acid; styrene; divinylbenzene; and various mixtures thereof. Acrylate and methacrylate esters and styrene are preferred.

The pigment may be dispersed initially in either a single normally liquid olefinically unsaturated monomer or in a blend of two or more miscible normally liquid olefinically unsaturated monomers. The subsequent addition of monomer to reduce the viscosity of the initially formed high shear mass may involve a single monomer or a mixture of two or more miscible monomers which may be the same as or different from that used to prepare the initial pigment dispersion. For example, the pigment may be dispersed initially in a single normally liquid olefinically unsaturated monomer to form a high shear mass that is subsequently reduced in viscosity by the addition thereto of either a single normally liquid olefinically unsaturated monomer that may be the same as or different from the initial monomer, or by a mixture of two or more miscible normally liquid olefinically unsaturated monomers which may or may not contain the initial monomer. Similarly, the pigment may be dispersed initially in a mixture of two or more miscible normally liquid olefinically unsaturated monomers and the resultant high shear mass reduced in viscosity by the addition of either a single monomer which may or may not be the same as one member of the initial monomer mixture, or by a mixture of two or more miscible monomers that may be the same as or entirely different from the initial monomer mixture or which contains one or more monomers common to the initial mixture. It is apparent from the foregoing that, by the practice of this invention, pigmented polymeric resin castings that are derived from homopolymers or copolymers may be prepared. In the description that follows concerning the technique for incorporating the pigment in the normally liquid olefinically unsaturated monomer and for forming an essentially uniform dispersion therein, the expression "normally liquid olefinically unsaturated monomer" is meant to denote the use of either a single olefinically unsaturated monomer or a mixture of two or more miscible olefinically unsaturated monomers.

In accordance with the present invention, the pigment may be added to the normally liquid olefinically unsaturated monomer in either the absence or the presence of a surfactant. When a surfactant is employed, any readily available surfactant or combination of surfactants may be employed. The surfactant or surfactant combination may include either cationic, anionic, or non-ionic surfactants or a combination of these types. In addition, the surfactant or surfactant combination employed may be either water soluble, water dispersible, or oil soluble. While the invention is not limited to any particular class or type of surfactant, the following are illustrative examples of specific surfactants that may be employed: tall oil fatty acid; oleic acid; Ester 253, a polyphosphoric ester of a higher alcohol furnished by Pflaumer Brothers Company; lorol diethanolamine; polyethylene polyamine condensate of castor oil; Rosin Amine D manufactured by Hercules Powder Company; soya lecithin; Emulsifier W-140, a surfactant manufactured by Witco Chemical Company; and Tyzor TLF 2005, an organic titanate containing polyhydroxy stearyl groups manufactured by Du Pont Company.

The pigment is added to the normally liquid olefinically unsaturated monomer in the presence or absence of a surfactant either in a batch process or in a continuous operation. In either case, the pigment is added to the monomer at a rate that permits wetting out of the pigment in the olefinically unsaturated monomer. The term "wetting out," as used herein, refers to the thorough distribution of the pigment particles, including pigment agglomerates, throughout the body of the olefinically unsaturated monomer. If the pigment is added so rapidly that it does not properly wet out, it will be appreciated that the subsequent breaking up of agglomerates and forming of an essentially uniform dispersion will be hindered. In addition, adding pigment more rapidly than it can properly wet out would most likely result in the stalling of the mixer. As the pigment, olefinically unsaturated monomer, and surfactant if any are mixed, with the relative proportion of pigment generally increasing, the power input requirements will, of course, generally increase. The heat generated by the mixing operation will likewise increase. This initial mixing phase of the process is continued until a high shear mass is obtained. In order to prevent thermally initiated polymerization of the olefinically unsaturated monomer during pigment addition and subsequent agitation of the resultant high shear mass, the mixer is cooled to maintain its contents at a temperature within the range of from about 40°F to 140° F and preferably within the range of from about 60° to 100° F. In addition, the normally liquid olefinically unsaturated monomer may conveniently contain a small amount of polymerization inhibitor.

The overall power input requirements in order to produce the high shear mass will depend upon various factors such as the particular pigment being employed, the particular olefinically unsaturated monomer into which the pigment is being mixed, and the particular pigment-olefinically unsaturated monomer-surfactant system employed as well as the characteristics of the particular mixing equipment utilized. It can readily be appreciated that the particular mixing equipment employed should be capable of developing high shear as the mixing is to be continued until a high shear mass is produced. Likewise, it is usually convenient and desirable that the subsequent agitation of the high shear mass, without further addition of pigment, be accomplished in the same equipment in which the high shear mass was produced. For this reason, it is convenient to carry out the mixing operation of the present invention in conventional equipment capable of developing high shear, for example, the Baker Perkins M-P or multipurpose type mixer. The particular equipment in which the mixing operation takes place is, however, not a critical feature of the present invention. Other commonly available equipment, such as a conventional plastics extruder or a double arm mixer, may readily be employed.

After the high shear mass has been produced, this mass is thereafter subjected to agitation in order to break up agglomerates of pigment and to insure the substantially uniform dispersion of the pigment in the olefinically unsaturated monomer. This operation may conveniently be carried out in the same mixing equipment as was used in the formation of the high shear mass. As stated above, in order to prevent initiation of polymerization, the mixer is cooled so as to maintain its contents at a temperature within the range of from about 40° to 140° F and preferably from about 60° to 100° F. During this phase of the process, additional pigment will not ordinarily be incorporated into the mass since, as indicated above, the purpose of this operation is to break down agglomerates and to insure the substantially uniform dispersion of the pigment throughout the highly concentrated dispersion mass. While the period of time is not critical, agitation in a double arm mixer will generally be from about 2 to 5 hours.

After the agglomerates have been broken down and the pigment dispersed essentially uniformly throughout the olefinically unsaturated monomer, the resulting composition comprises a highly concentrated, stable base pigment dispersion in olefinically unsaturated monomer. While the amount of pigment in the base dispersion is not critical, the dispersion will generally contained from about 55 percent to about 95 percent by weight of pigment. Generally speaking, base pigment dispersion prepared with inorganic pigments will have a higher percentage of pigment than similar base pigment dispersions prepared with organic pigments. Thus, base pigment dispersions prepared with inorganic pigments will often have a pigment concentration of from about 90 percent to about 95 percent by weight of the base dispersion, whereas base pigment dispersions prepared with organic pigments will often have a pigment concentration of from about 55 percent to about 70 percent by weight of the base dispersion. These concentration ranges are not critical, however, as pigment concentrations outside these ranges can also be prepared.

The concentration of surfactant, if used, in the base pigment dispersion will ordinarily range from about 2 percent to about 10 percent by weight of the base pigment dispersion. When a particularly effective surfactant or surfactant combination is employed, the surfactant concentration will ordinarily be within the range of from about 2 percent to about 6 percent by weight of the base pigment dispersion. Surfactant concentrations of up to 10 percent of the base dispersion are employed when using relatively less effective surfactants.

The base pigment dispersion in olefinically unsaturated monomer obtained on agitation of the high shear mass of pigment, olefinically unsaturated monomer and surfactant, if used, is of a highly viscous nature which makes subsequent handling difficult and, in addition, contains pigment in far greater excess than is desired in the product pigmented polymeric resin casting. Accordingly, the high shear mass is reduced in viscosity by the addition thereto, with mixing, of additional normally liquid olefinically unsaturated monomer in an amount that will give the pigment concentration desired in the polymeric resin casting. Most conveniently, this subsequent addition of monomer may be accomplished in the same mixing equipment heretofore employed in the preparation of the base high shear pigment dispersion. As indicated above, the olefinically unsaturated monomer employed in the subsequent addition may be either a single monomer or a mixture of two or more miscible olefinically unsaturated monomers. The subsequently added monomers, as already pointed out, may be the same as or different from the monomer initially used in forming the base high shear dispersion. During the subsequent mixing of additional monomer with the base high shear pigment dispersion, precautions are of course taken to keep the temperature of the mixture within the range of about 40° to 140° F and preferably about 60° to 100° F.

The amount of olefinically unsaturated monomer subsequently added to the base high shear pigment dispersion to reduce its viscosity and to give the desired pigment concentration is not critical and may vary broadly depending on such factors as the tinting strength of the pigment and the intensity of color desired as well as the monomer used. Generally, however, the final dispersion of pigment in normally liquid olefinically unsaturated monomer will have a pigment concentration of from about 1 percent to about 10 percent by weight of the final dispersion. It will be understood, however, that pigment concentrations outside this range can, if desired, be employed. It will, of course, be appreciated that various conventional ingredients such as stabilizers and anti-settling aids may be present in the final pigment dispersion.

The foregoing relatively fluid final dispersion of pigment in normally liquid olefinically unsaturated monomer is placed in a suitable container, or mold, and subjected to polymerizing conditions. The choice of mold or container in which polymerization is carried out depends only on what object is sought to be made. Thus, suitable molds may be used to make pigmented polymeric resin castings in the form of radio and appliance housings, road markers and signs, items of trim for motor vehicle applications, toys, handles for kitchen utensils, etc. If desired, cast sheets of pigmented polymeric resin may be made. The polymeric resin sheets may, if desired, be cut in the form of various shapes and designs. Alternatively, the polymeric resin sheets may be ground up and fed to an injection molder to form injection molded articles.

The exact conditions for inducing polymerization in the final dispersion of pigment in normally liquid olefinically unsaturated monomer which is contained in a suitable mold will depend on the olefinically unsaturated monomer and will be readily apparent to those skilled in the art. While the polymerization of the monomer may be induced thermally solely by heating, it is usually preferred to employ a small amount of a polymerization initiator. Depending on the nature of the olefinically unsaturated monomer, the preferred initiator may operate by a cationic, anionic, or free radical mechanism. The choice of cationic, anionic, or free radical initiator is well within the capability of one skilled in the art to determine. Generally, however, a free radical initiator is preferred. The free radical initiator may, for example, be selected from among azobis isobutyronitrile, inorganic peroxides, and organic peroxides. As is well known, the free radical initiator is activated by heat. That is, the dispersion of pigment in monomer containing the free radical initiator, in a suitable mold, is heated, thereby forming free radicals which initiate the polymerization. The time for polymerization to be completed will depend on such variables as polymerization temperature, the nature of the monomer, and the amount of initiator. One skilled in the art can readily tell when polymerization is complete. On completion of polymerization, the pigmented polymeric resin casting is removed from the mold and, depending on its end use, may either be used as is or subjected to further processing operations.

The present invention is hereinafter further described with reference to particular examples thereof. It will be appreciated that these examples are presented for illustrative purposes and should not be construed as limitations on the invention as hereinabove described.

EXAMPLE I

To a small laboratory sigma blade mixer with cold water being circulated through the jacket are charged 400 g. of inhibited methyl methacrylate monomer and 150 g. of Ester 253 surfactant. Cadmium red pigment is added incrementally as follows while the mixer is running, each increment of pigment being added as soon as the preceding increment has been wet out in the monomer-surfactant mixture: 2000 g., 1000 g., 500 g., 250 g., 250 g., 175 g., 175 g., 150 g. The pigment addition is made over a 45 minute period after which the resultant high shear mass is agitated for three hours. During the three hour agitation period, the power consumption of the mixer gradually decreases, the mass becomes glossier, and the pigment agglomerates gradually disappear. An additional 345 g. of methyl methacrylate monomer are then added followed by agitation for an additional 30 minutes. This pigment dispersion is cut back with additional methyl methacrylate monomer, a polymerization catalyst is added, and the mixture is polymerized to produce uniformly colored resin sheets or castings possessing excellent light fastness and being free of gas bubbles.

EXAMPLE II

To a 3 gal. laboratory sigma blade mixer with cold water being circulated through the jacket are added 1,200 g. of inhibited methyl methacrylate monomer, 100 g. of oleic acid, 160 g. of Emulsifier W-140, and 8 g. of Tyzor TLF 2005 surfactant. To this mixture are added, with mixing, 2,400 g. of phthalocyanine blue. Mixing is continued until the pigment is wet out in the monomer. Two additions of 400 g. each of pigment are then made followed by an addition of 200 g. and two additions of 100 g. each of the pigment. In each case, the pigment addition is made only after the previously added pigment has been well wet out in the monomer. Agitation is continued for four hours. The mixture is then cut back by the addition of 2,100 g. of methyl methacrylate monomer. The mixture at this point is an excellent dispersion of the pigment in the monomer. This dispersion is cut back further with additional methyl methacrylate monomer, polymerization catalyst is added, and the mixture is polymerized to produce cast resin sheets or cast articles that are uniformly colored, exhibit good clarity and transparency, and have good light fastness.

EXAMPLE III

To a 1 gal. Baker Perkins laboratory mixer with cooling water being circulated through the jacket are charged 400 g. of inhibited styrene monomer and 160 g. of Ester 253 surfactant. To this agitated mixture is added a cadmium yellow pigment in increments as follows, each increment being allowed to become thoroughly wet out in the monomer-surfactant mixture prior to addition of the subsequent increment of pigment: 2,000 g., 1,000 g., 250 g., 250 g., 250 g., 250 g., 175 g., 150 g., 100 g., 75 g. The mixture is then agitated for three hours. The pigment dispersion is then cut back by the addition of 425 g. of styrene monomer, the styrene being added, with mixing, over a 30 minute period. This pigment dispersion is cut back further with additional monomer, a polymerization catalyst is added, and the mixture is placed in suitable molds and polymerized to produce uniformly colored polystryene castings having excellent light fastness.

EXAMPLE IV

To a 1 gal. laboratory Baker Perkins sigma blade mixer with cooling water being circulated through the jacket are charged 450 g. of inhibited methyl methacrylate monomer and 30 g. of Tyzor TLF 2005 surfactant. Incremental additions of barium 2B red pigment are made to the agitated monomer-surfactant mixture over a two hour period, each increment of pigment being added only after the preceding increment had been wet out. The sizes of the increments and the times for wetting out to occur are as follows: 500 g., 5 minutes; 200 g., 10 minutes; 100 g., 10 minutes; two 50 g. increments, 10 minutes each; two 25 g. increments, 15 minutes each. The resultant pigment dispersion is agitated at high shear for 4.5 hours. The dispersion is cut back by the addition, with mixing, of an additional 600 g. of methyl methacrylate monomer. This pigment dispersion is cut back further with additional methyl methacrylate monomer, a polymerization catalyst is added, and the mixture is placed in suitable molds and polymerized to produce uniformly colored resin castings having excellent clarity and good light fastness.

While the foregoing examples illustrate specific embodiments of my invention, it will be understood that the other embodiments as disclosed herein may also be practiced. Organic and inorganic pigments and normally liquid olefinically unsaturated monomers generally may be employed in the practice of this invention. Although the examples demonstrate the presence of a surfactant in the normally liquid olefinically unsaturated monomer during addition of the pigment, it is to be understood that the presence of a surfactant is not required. It will also be appreciated by one skilled in the art that the pigment may be added to a blend of two or more miscible normally liquid olefinically unsaturated monomers and that the olefinically unsaturated monomer added to reduce the viscosity of the base pigment dispersion may be the same as or different from the initial olefinically unsaturated monomer.

Thus, by the practice of this invention it is possible to obtain superior pigmented polymeric resin castings. Pigmented polymeric resin castings obtained by the process of the instant invention are characterized by high gloss, lack of internal flaws, and retention of physical properties.

While this invention has been illustrated by the presentation of specific embodiments thereof, it will be understood that the scope of the invention is limited only by the appended claims.

I claim:

1. A process for preparing pigmented polymeric resin castings comprising:

a. adding pigment to a normally liquid olefinically unsaturated monomer, selected from acrylonitrile, acrylate esters, methacrylate esters, styrene, and mixtures thereof, with mixing, the rate of addition of said pigment being such as to permit wetting out of the pigment in said monomer, said addition being continued until a high shear mass is obtained, b. agitating said high shear mass for a period of time sufficient to permit the essentially complete breaking down of agglomerates and the forming of an essentially uniform base dispersion of the pigment in the monomer, wherein the dispersion contains from about 55 wt. percent to about 95 wt. percent of pigment, c. adding to said base pigment dispersion, with mixing, additional normally liquid olefinically unsaturated monomer selected from acrylonitrile, acrylate esters, methacrylate esters, styrene and mixtures thereof to reduce the viscosity thereof, with the dispersion of reduced viscosity containing from about 1 wt. percent to about 10 wt. percent of pigment,
d. placing the dispersion of reduced viscosity in a suitable mold; and
e. subjecting said dispersion of reduced viscosity to polymerizing conditions.

2. The process of claim 1 wherein the steps of (a) adding pigment to a normally liquid olefinically unsaturated monomer to form a high shear mass, (b) agitating said high shear mass to form a base pigment dispersion in said monomer, and (c) adding additional normally liquid olefinically unsaturated monomer to said base pigment dispersion are conducted at a temperature within the range of from about 40° to about 140° F.

3. The process of claim 2 wherein the base pigment dispersion in normally liquid olefinically unsaturated monomer contains from about 90 percent to about 95 percent by weight of inorganic pigment.

4. The process of claim 2 wherein the base pigment dispersion in normally liquid olefinically unsaturated monomer contains from about 55 percent to about 70 percent by weight of organic pigment.

5. The process of claim 2 wherein said pigment is added, with mixing, to a normally liquid olefinically unsaturated monomer containing a surfactant in an amount such that the resultant base pigment dispersion in normally liquid olefinically unsaturated monomer contains from about 2 percent to about 10 percent by weight of said surfactant.

6. The process of claim 2 wherein the polymerization is initiated by a free radical source.

* * * * *